INVENTOR
Shubael C. Stratton

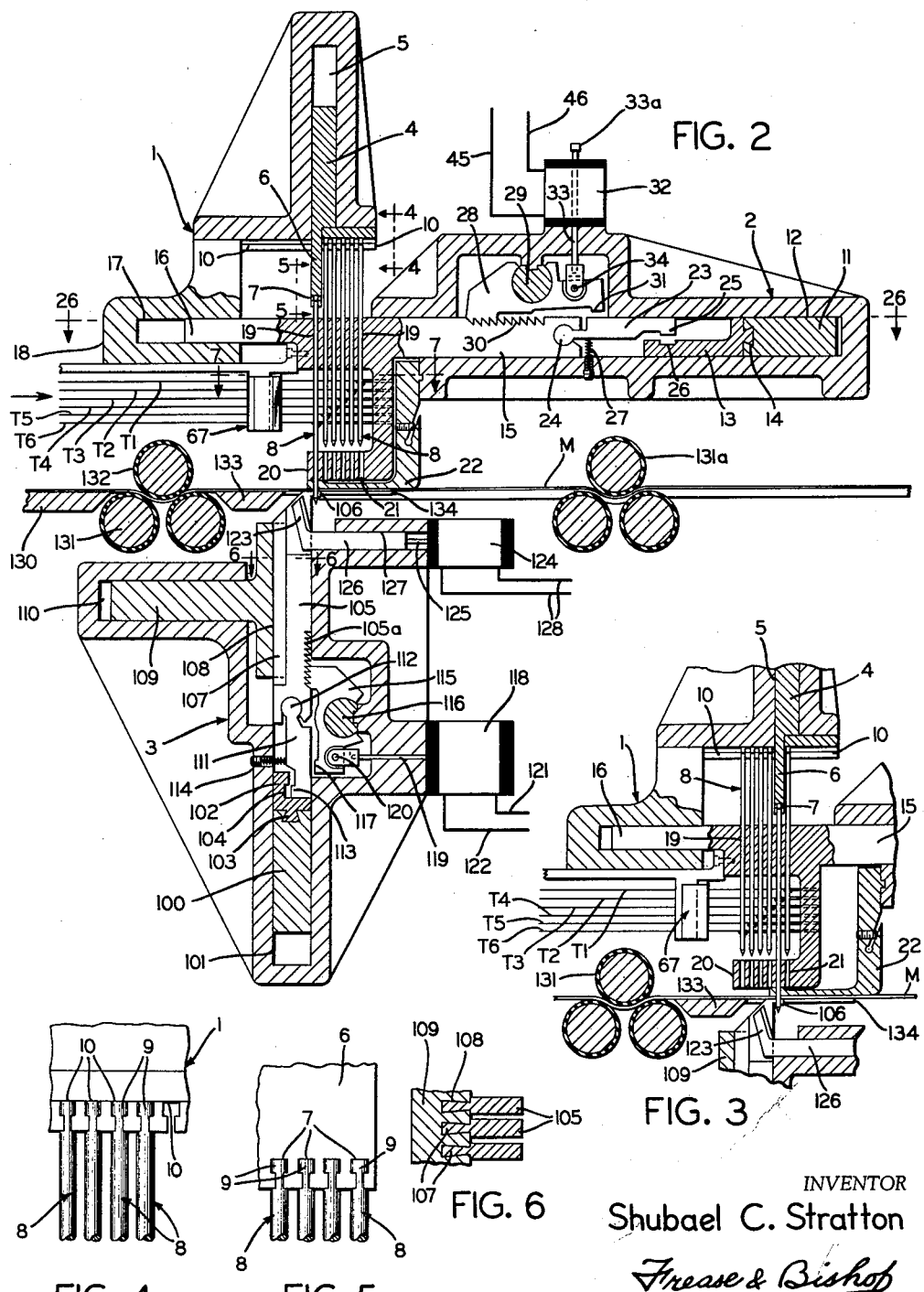

Jan. 29, 1963 S. C. STRATTON 3,075,481
APPARATUS FOR MAKING TUFTED PILE FABRICS
Filed Sept. 23, 1958 7 Sheets-Sheet 3
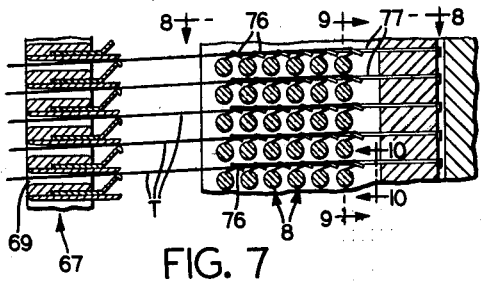
FIG. 7
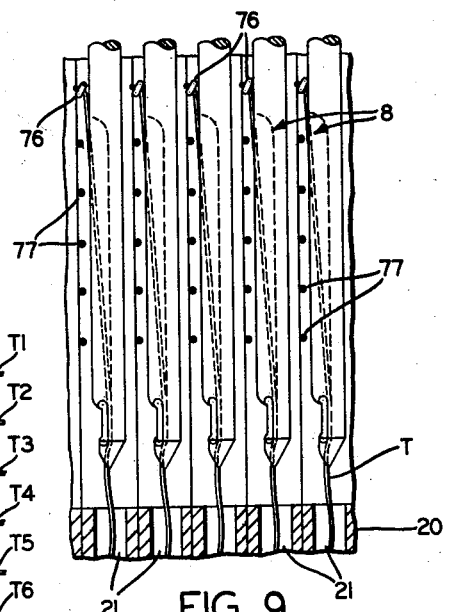
FIG. 9
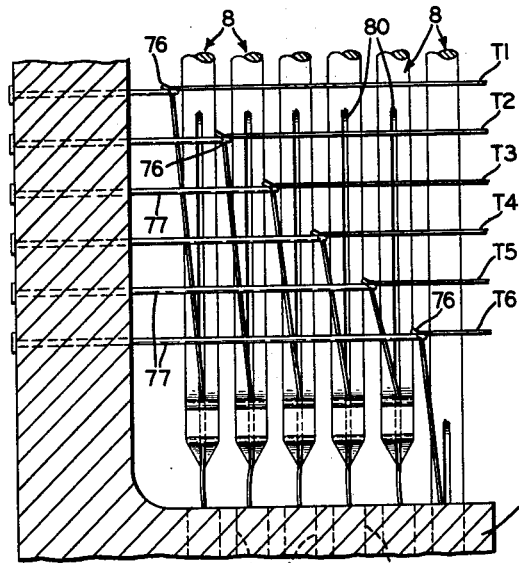
FIG. 8
FIG. 14
FIG. 10
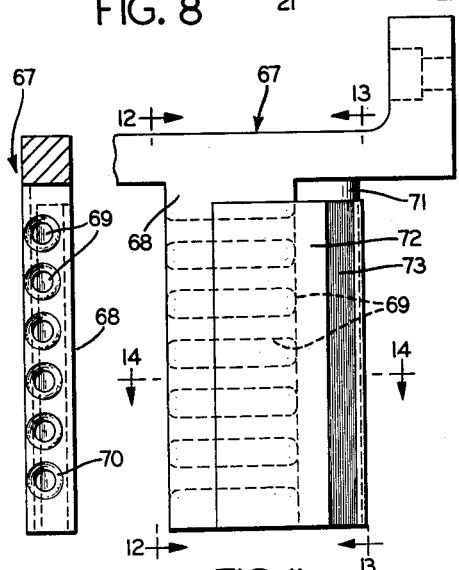
FIG. 12  FIG. 11
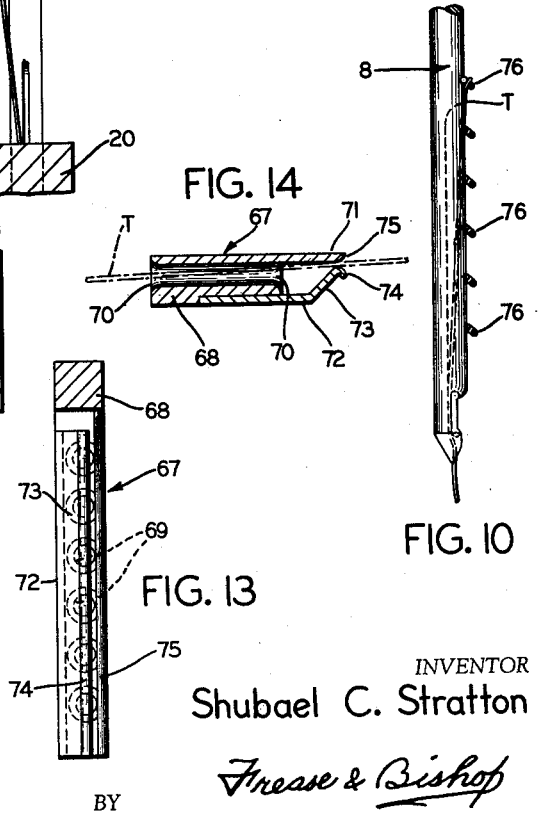
FIG. 13
INVENTOR
Shubael C. Stratton
BY Frease & Bishop
ATTORNEYS

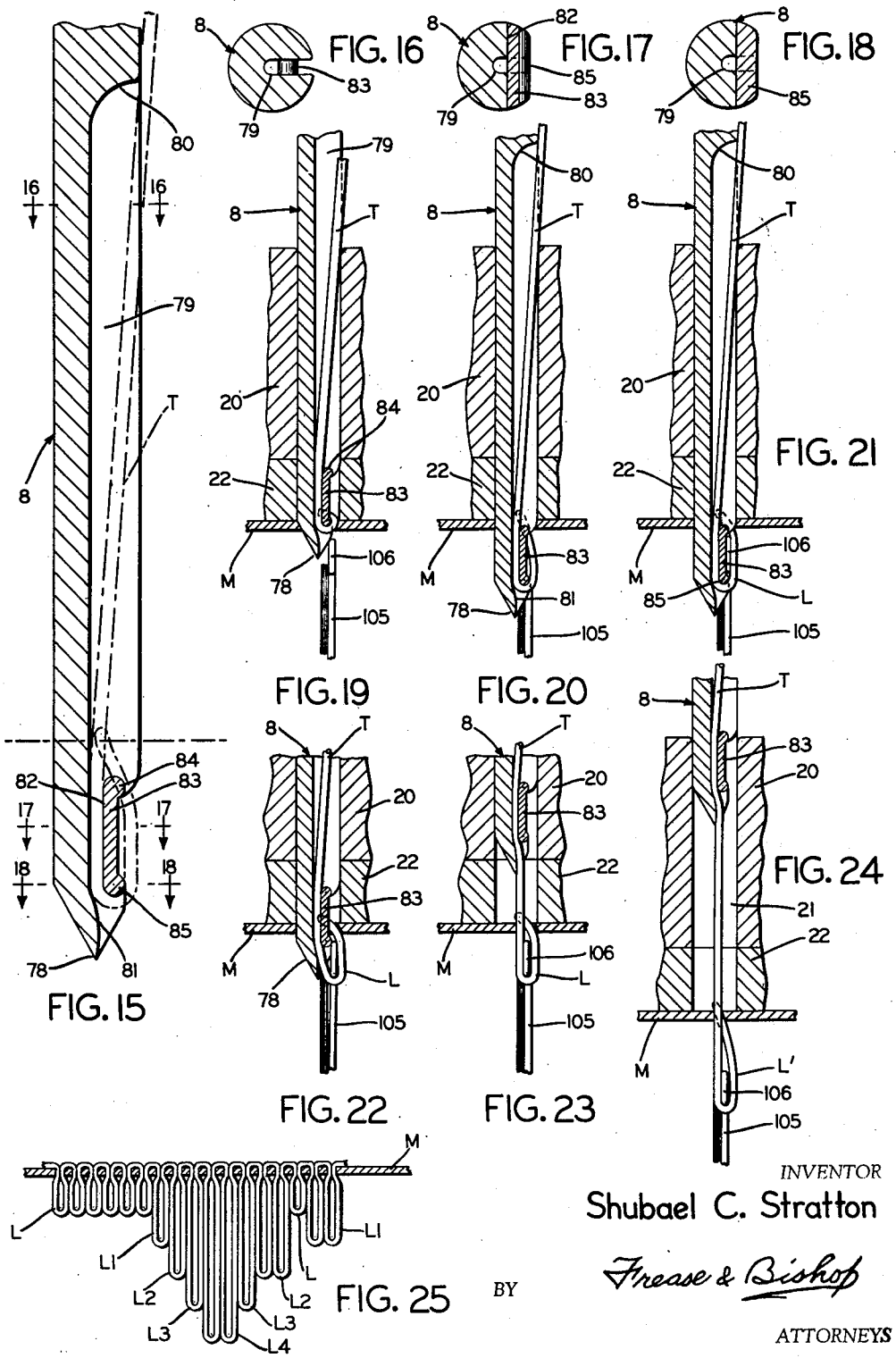

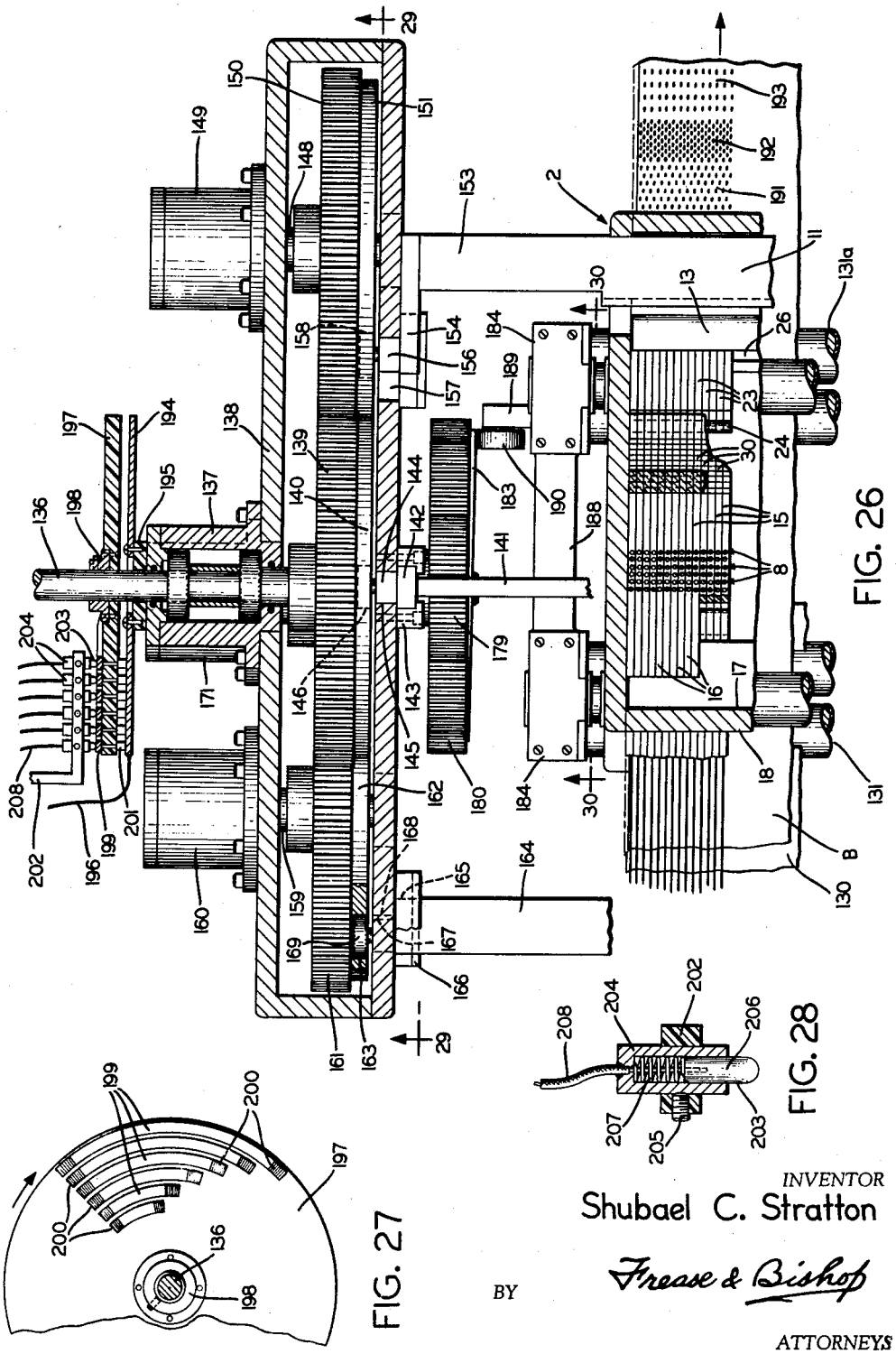

Jan. 29, 1963 S. C. STRATTON 3,075,481
APPARATUS FOR MAKING TUFTED PILE FABRICS
Filed Sept. 23, 1958 7 Sheets-Sheet 6

INVENTOR
Shubael C. Stratton
BY Frease & Bishop
ATTORNEYS

Jan. 29, 1963  S. C. STRATTON  3,075,481
APPARATUS FOR MAKING TUFTED PILE FABRICS
Filed Sept. 23, 1958  7 Sheets-Sheet 7

INVENTOR
Shubael C. Stratton
BY  Frease & Bishop
ATTORNEYS

3,075,481
APPARATUS FOR MAKING TUFTED PILE FABRICS
Shubael C. Stratton, Box 67, Magnolia, Ohio
Filed Sept. 23, 1958, Ser. No. 762,830
6 Claims. (Cl. 112—79)

The invention relates to machines for making tufted pile fabrics such as carpets, draperies, tapestries, upholstery materials, bed spreads, clothing material and the like, and more particularly to certain improvements in such apparatus whereby any desired patterns in a plurality of colors may be produced, and whereby patterns may be produced in a plurality of different heights of pile, and whereby independent loops may be selectively cut or uncut as desired, and to other improvements in such apparatus which will be hereinafter described in detail.

Under present practice, with such pile tufting machines as are now available, it is not possible to produce patterns in various colors in the tufted pile fabrics. The only variation in color which can be obtained on present machines is the formation of straight strips of color running longitudinally throughout the length of the tufted fabric. This is due to the fact that under present practice there is only a single needle in each station of the machine.

In such machines as are at present available it is usually possible to produce only two heights of tufts, and such machines ordinarily increase the height of a loop by robbing the next preceding loop, which this machine does not do.

Also, under present practice, it is necessary to adjust the machine so that all loops are cut or all loops remain uncut in the entire finished pile fabric.

Such machines as are now in use are so constructed that the loops can be placed in the fabric only in rows located apart a distance equal to the transverse spacing of the needles in adjacent stations of the machine.

It is therefore an object of the invention to provide an apparatus for making tufted pile fabrics which overcomes the above-mentioned difficulties and disadvantages and which includes improved mechanism and operation for producing improved tufted pile fabrics.

Another object of the invention is to provide an apparatus of the character referred to in which any desired pattern in varying colors may be produced in the tufted pile fabric.

A further object of the invention is to provide such a machine having a plurality of needles in each station of the machine with means for automatically selecting and operating any desired needle in each station.

A still further object of the invention is to provide a machine of this character in which a single reciprocating needle bar is provided in each station for operating the selected needle, and the remainder of the needles in each station are held inoperative in a needle-holding device, with means for automatically removing any desired needle from said needle holder and attaching it to the reciprocating needle bar at any desired time when color change is desired.

It is also an object of the invention to provide a machine for making tufted pile fabric in which each of the plurality of needles in each station of the machine carries a thread or yarn of a different color and any needle may be automatically operated at any desired time.

Another object of the invention is to provide an improved type of needle for use in such machines.

A further object is to provide an improved yarn or thread-feeding means for feeding the yarns or threads to the operating needles.

A still further object of the invention is to provide a machine of this character having improved looper operating mechanism for varying the heights of the loop as desired throughout the entire operation of the machine.

Another object of the invention is to provide such a machine having a loop-cutting knife with means for automatically operating said knife at any desired time during the operation of the machine for cutting any desired loop or loops in the tufted pile fabric.

A further object is to provide a machine of this character having a programming roll for selectively operating the pile-cutting knife at any desired time.

Still another object of the invention is to provide such a machine in which a plurality of programming rolls, equal in number to the needles in each station of the machine, is provided for automatically selecting the desired needle from each station and mounting it in the reciprocating needle bar at any desired time.

Another object is to provide a machine of the character referred to having a plurality of programming rolls equal in number to the number of heights of pile desired for selectively operating the looper mechanism.

A further object of the invention is to provide a machine of this character having means for reciprocating the backing material laterally during operation of the machine in order to produce two or more laterally and/or diagonally spaced longitudinal rows of loops at each station of the machine, thus changing the gauge and pattern of the loops.

It is also an object of the invention to provide such a machine having tensioning means for the yarn or threads as it is fed to the needles.

These and other objects apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawings.

In general terms the invention may be briefly described as comprising a machine for making tufted pile fabrics having a plurality of longitudinally spaced needles in each station of the machine and means for feeding a thread or yarn of different color to each needle in each station.

A continually reciprocating needle bar is provided in each station for operating any one of the needles at said station, and a holder is provided for holding the remaining needles in each station out of the operation. Means in the form of a needle selector shuttle is provided in each station for automatically moving a needle from the needle bar into the needle holder and selectively placing any other desired needle from the needle holder in the needle bar, as color changes are required in the pattern.

The needle selector mechanism is operated by a continually reciprocating bar and the selector shuttle in each station is selectively connected to said sliding bar at any desired time through operation of a solenoid energized by any one of a plurality of programming rolls equal in number to the number of needles in each station.

The looper mechanism includes a continually reciprocating looper slide bar and a reciprocal looper positioning bar with a separate looper hook for each station of the machine, and solenoid-operated means selectively energized by any one of a plurality of programming rolls, equal in number to the number of heights of loops which may be formed upon the machine, for selectively connecting the looper hook in each station to the reciprocating looper slide bar.

A loop-cutting knife in each station of the machine is adapted to be operated by a solenoid selectively energized by a programming roll for selectively operating the knife at any desired time to cut or not cut one or a series of loops as may be desired.

The improved machine includes various other mechanisms which will be hereinafter described in detail.

Referring now to the drawings, in which a preferred embodiment of the invention is illustrated, FIG. 1 is a longitudinal sectional view through one station of the machine;

FIG. 2 is an enlarged fragmentary, longitudinal, sectional view of the needle operating and selector shuttle means and the looper operating means;

FIG. 3 is a fragmentary, longitudinal, sectional view of the needle holder and needle bar showing the needles in a different position from that shown in FIGS. 1 and 2;

FIG. 4 is an enlarged fragmentary, transverse sectional view of a portion of the needle holder viewed as on the line 4—4, FIG. 2;

FIG. 5 is an enlarged, fragmentary elevation of the needle bar and portions of needles in adjacent stations mounted therein, viewed as on the line 5—5, FIG. 2;

FIG. 6 is an enlarged fragmentary section through the looper pull-back bar and a plurality of loopers in adjacent stations of the machine taken as on the line 6—6, FIG. 2;

FIG. 7 is an enlarged fragmentary section through a plurality of adjacent stations of the machine, taken as on the line 7—7, FIG. 2, showing the thread-tensioning and guide means associated with the needles;

FIG. 8 is an enlarged sectional view taken as on the line 8—8, FIG. 7;

FIG. 9 is an enlarged sectional view taken as on the line 9—9, FIG. 7;

FIG. 10 is an enlarged sectional view taken as on the line 10—10, FIG. 7;

FIG. 11 is an enlarged fragmentary elevation of the thread guide and tensioning means;

FIG. 12 is a sectional view taken as on the line 12—12, FIG. 11;

FIG. 13 is a sectional view taken on the line 13—13, FIG. 11;

FIG. 14 is a transverse sectional view taken on the line 14—14, FIG. 11;

FIG. 15 is a greatly enlarged longitudinal sectional view through the improved needle;

FIG. 16 is a transverse section on the line 16—16, FIG. 15;

FIG. 17 is a transverse section taken on the line 17—17, FIG. 15;

FIG. 18 is a transverse section through the needle taken on the line 18—18, FIG. 15;

FIG. 19 is an enlarged vertical sectional view through a portion of a needle and the corresponding looper hook showing the start of the downward stroke of the needle for forming the first loop in the backing material;

FIG. 20 is a similar view showing the needle at the lower limit of its stroke;

FIG. 21 is a view similar to FIG. 20, showing the looper hook engaged in the first loop formed by the needle;

FIG. 22 is a similar view showing a needle starting the upward stroke with the loop held by the looper hook;

FIG. 23 is a similar view showing the needle at a higher position on the upstroke, with the loop held by the looper hook;

FIG. 24 shows the loop pulled down to desired limit by the looper;

FIG. 25 is a fragmentary, longitudinal sectional view through a portion of tufted pile fabric showing the plurality of different heights of loops which may be formed by the machine;

FIG. 26 is a fragmentary, horizontal, sectional view through a portion of a machine taken as on the line 26—26, FIG. 2, showing the gearing and cams for operating the various slide bars of the machine;

FIG. 27 is a fragmentary elevation of a rotatable timing disc;

FIG. 28 is an enlarged sectional view through one of the brushes of the timing device;

Figure 1:
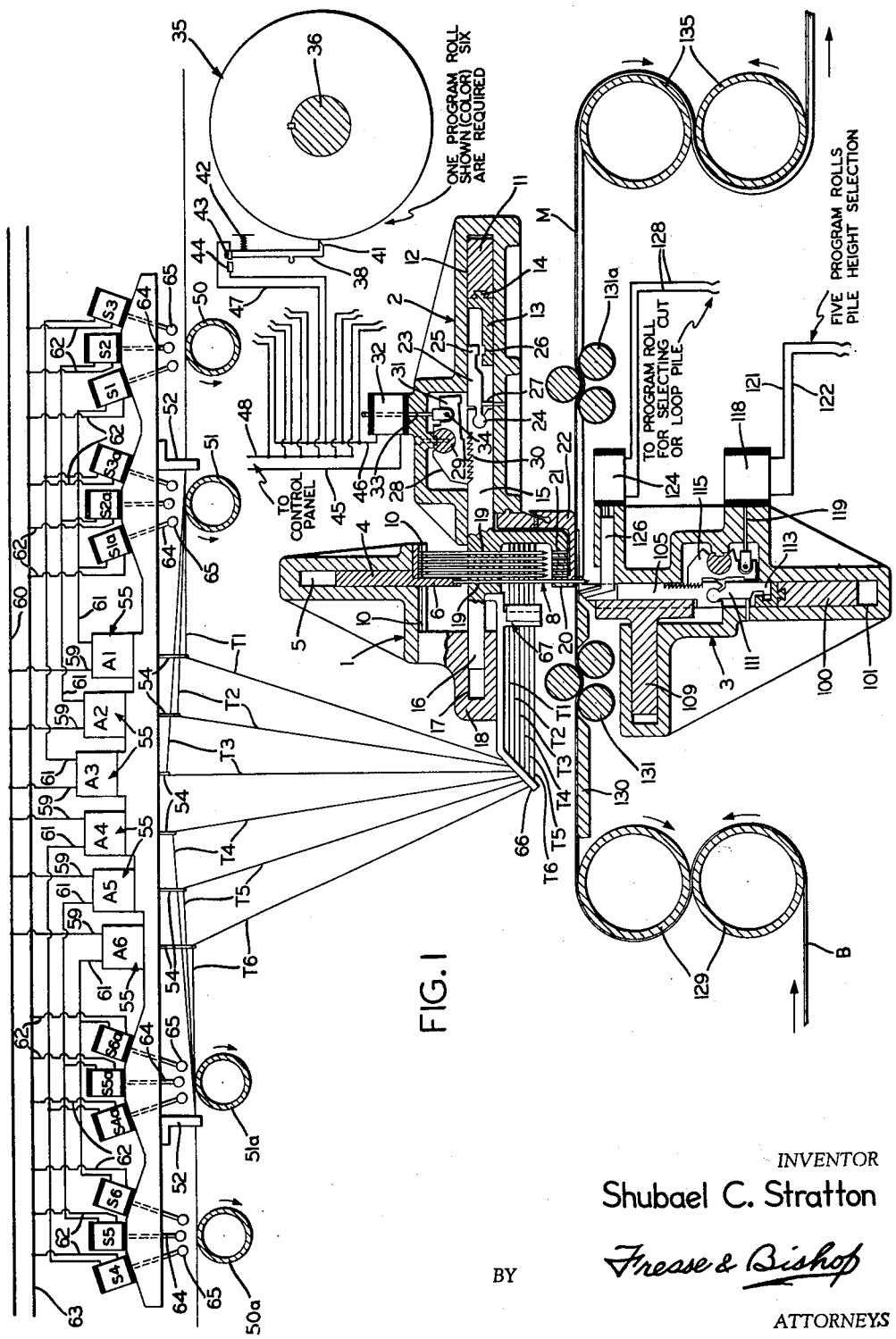

Reference is now made to the embodiment of the invention illustrated in which similar numerals refer to similar parts throughout. The machine includes the needle bar and needle holder housing 1, the needle selector shuttle housing 2 located forwardly thereof and the looper housing 3 located therebelow. These housings extend transversely across the width of the machine.

A transversely disposed needle bar 4 is vertically reciprocal within the guide 5 in the housing 1 and is provided with the reduced extension 6 on its lower side. A plurality of T-shape slots 7 are formed in the lower edge of the depending extension 6 of the needle bar, these T-shape slots being spaced so as to locate one slot in each station of the machine, that is the point where longitudinal rows of loops or tufts are formed in the backing material. Each needle, indicated generally at 8, has a T-shape head 9 at its upper end adapted to be received in the T-shape slots 7 of the needle bar.

A novel feature of the invention comprises the provision of a plurality of needles in each station of the machine with selective means for positioning any needle at each station in the needle bar, while the remainder of the needles which are not in use at the time are held in position to be selectively connected to the needle bar at any desired time.

For the purpose of holding the needles not in use in this position, aligned T-shape grooves 10 are formed in the housing 1, forwardly and rearwardly of the needle bar extension 6. The T-shape grooves 10 in the housing 1 are arranged to be aligned with the T-shape grooves 7 in the needle bar when the needle bar is at the upper limit of its movement.

As shown in the drawings, with particular reference to FIGS. 1, 2 and 3, the machine is provided with six needles at each station. Any one of these six needles may be selectively attached to the needle bar at any time during the operation of the machine. It should be understood that while six needles are shown in each station, this is merely for the purpose of illustration, and any desired number of needles may be incorporated in each station depending upon the number of colors of yarn required for any particular pattern.

As shown in FIGS. 1 and 2, the rearmost needle in this station is attached to the needle bar while the other five needles not in use are suspended in the T-shape slot 10 forwardly of the needle bar.

As shown in FIG. 3 the second needle from the front is attached to the needle bar, the front needle in the station being suspended in the T-shape groove 10 in the housing 1, forwardly of the needle bar, while the other four needles not in use are suspended in the T-shape grooves 10 rearwardly of the needle bar.

For the purpose of selectively attaching any one of the six needles at each station to the needle bar, a needle selector shuttle is mounted within the housing 2 and includes the needle selector shuttle bar 11 extending transversely entirely through the housing 2 and mounted for forward and rearward reciprocation within the guide 12 of said housing.

A rearwardly disposed reduced extension 13 may be formed upon or rigidly connected to the bar 11 as by the dove-tail rib and groove 14. The bar 11 is continually reciprocated by means which will be later described in detail.

A reciprocal needle shifting member 15, for each station of the machine, is mounted within the housing 2 and has a rearward extension 16 slidable within the guide 17 in the removable extension 18 of the housing 1. The member 15 has a plurality of vertical apertures 19 therein through which the needles of the station are located and adapted to be reciprocated.

A depending foot 20 is formed upon the needle shifting member 15 and provided with a plurality of vertical apertures 21 through which the needles are adapted to reciprocate when connected to the needle bar. The foot portion 20 of the needle shifting member 15 is adapted to reciprocate forwardly and rearwardly upon the depending foot portion 22 of the housing 2.

During the moment of needle change, as the needle shifting member 15 is moved for selection of another needle, the thread from the needle last used will be cut between the aperture in the foot 20 of the needle shifting member and the aperture in the stationary foot portion 22 of the housing 2.

A latch member 23 is pivoted as at 24 to the rear end of each needle shifting member 15 and is provided with a depending nose 25 normally held out of contact with the groove 26 in the extension 13 of the bar 11 by means of a spring or rubber compression member 27.

A pawl 28 is pivoted at 29 in the housing 2 and normally engages the ratchet teeth 30 on the needle shifting member 15 to hold the same against movement. At the other end of the pawl 28 is a depending nose 31 adapted to be moved into contact with the pivoted latch member 23 to depress the same to engage the nose 25 thereof in the groove 26 of the extension 13 of the bar 11, so as to cause the needle shifting member 15 to be moved therewith.

It should be understood that the apparatus is so timed that the member 15 will be connected to the reciprocating bar 11 and moved thereby only at the instant when the needle bar 4 is in its uppermost position with the T-shape notches 7 therein registering with the T-shape notches 10 of the needle holder so that all of the needles 8 of that particular station may be shifted forwardly, as may be necessary to position the desired needle in the needle bar.

The pawl 28 in each station is shown as being independently operated by a solenoid 32, the armature 33 of which is pivotally connected as at 34 to the pawl 28 for rocking the same as above described.

The solenoid 32 is adapted to be selectively energized by means of a plurality of programming rolls. As there are six needles in the embodiment of the invention shown, there will be six programming rolls, one for each needle.

Only one of these programming rolls is shown in FIG. 1, being indicated generally at 35. These programming rolls are located at a convenient point adjacent to the machine, each roll being fixed upon a continually rotating shaft 36 which may be rotated at desired speed by any usual and well known drive mechanism (not shown).

One of the programming rolls is shown in detail in FIGS. 35 to 39. The periphery of each programming roll is provided with a plurality of annular rows of suitable demarcations which may be in the form of indentations 37 as shown in the drawings. These rows of demarcations are equal in number to the number of stations in the machine.

It will be understood that there is one set of six needles in each station of the machine and that the distance between the needles transversely across the machine, that is the distance between needles in adjacent stations, fixes the gauge of the machine, that is the distance between the longitudinal lines of tufting or loops in the tufted fabric.

A pivoted make-and-break device 38 is provided for operation by each row of demarcations 37 upon the programming roll and operates to intermittently energize the solenoid 32 of the corresponding station of the machine.

Each of the make-and-break devices 38 is in the form of a lever fulcrumed at 39 upon a stationary portion 40 of the machine and having a depending finger 41 urged into contact with the periphery of the programming roll as by an expansion spring 42 or the like to urge the movable contact 43 upon the other end of the make-and-break lever 38 toward the fixed contact 44.

One of the coils of each solenoid 32 is connected to a wire 45, the other end of said coil being connected to a wire 46 which leads to the fixed contact 44. A wire 47 connects the movable contact 43 with the other wire 48.

If it is desired to further control the operation of the solenoids 32 by a timing device, as will be later described in detail, the wires 45 and 48 may be connected through said timing device to a suitable source of power. Otherwise, the wires 45 and 48 may themselves be line wires.

A plurality of needles is provided at each station of the machine in order that a plurality of different colors of thread or yarn may be used for the purpose of producing any desired pattern or color in the finished tufted pile fabric, this pattern being controlled by the arrangement of demarcations on the programming rolls which control the energizing of the solenoids 32.

In the operation of the needle selector shuttle, when the solenoid 32 of any station in the machine is operated by any one of the six programming rolls, the pawl 28 will be rocked upon its pivot disengaging the same from the ratchet teeth 30 on the needle shifting member 15 and moving the nose 31 on the other end of said pawl into engagement with the pivoted ratchet member 23 pushing the nose 25 thereof into the notch 26 of the reciprocating bar 11.

The machine is so timed that as the needle bar 4 reaches the upper limit of its movement bringing the T-shaped notches 7 thereof into register with the T-shape notches 10 of the needle holder, the needle shifting member 15 will be moved forward and then backward for needle selection, to connect the desired needle to the needle bar.

As above mentioned, a different color of thread or yarn is threaded into each of the six needles at each station of the machine. As best shown in FIG. 1, the six different colored threads for one station are indicated at T1, T2, T3, T4, T5 and T6.

In order to thread the needles 8, the removable housing extension 18 is removed from the housing 1, permitting the needle shifting member 15 and associated parts to be removed from the housing. For this purpose the armature 33 of the solenoid 32 must be moved to neutral position to disengage the pawl 28 from the ratchet teeth 30, but without engaging the latch member 23 with the groove 26 of the bar 11. This may be accomplished by extending the armature 33 entirely through the solenoid as indicated at 33a so it may be manually operated.

These threads are withdrawn from conventional sources of supply such as spools or the like located adjacent to the machine. Preferably, as shown in FIG. 1, three of the threads are drawn from one end of the machine and the other three threads are withdrawn from the other end of the machine, these threads passing through novel thread-feeding means which form a part of the invention.

As shown in FIG. 1, the three threads indicated at T1, T2 and T3 are withdrawn from a source of supply at the forward end of the machine, or to the right as viewed in the drawings, over a spaced pair of continually rotating rolls 50 and 51, it being understood that the three threads are spaced slightly apart longitudinally of the rolls.

In the same manner the other three threads T4, T5 and T6 are withdrawn from a suitable source of supply at the rear end of the machine, or to the left as viewed in the drawings, and passes over the continually rotating rolls 50a and 51a.

Suitable thread guides 52 may be provided adjacent to these rolls to keep the threads spaced slightly apart in the manner above mentioned. Each thread, after passing over these rolls, is threaded through an eye 53 in the switch blade 54 of a switch indicated generally at 55 and shown in detail in FIG. 40. The switch blade 54 is normally held in open position by a spring 56, holding the contact 57 thereon away from the fixed contact 58.

The movable contact 57 of each switch 55 is connected by a wire 59 to a line wire 60 and the fixed contact 58 of each switch is connected by a wire 61 to a pair of solenoids which operate means cooperating with the rolls 50, 51, 50a and 51a.

Three of these solenoids are associated with each of the continually rotating rolls, the solenoids S1, S2 and S3 being associated with the roll 50, the solenoids S1a, S2a and S3a being associated with the roll 51.

In like manner the solenoids S4, S5 and S6 are associated with the roll 50a and the solenoids S4a, S5a and S6a are associated with the roll 51a. Each of the solenoids is connected to the line wire 63.

The six switches indicated generally at 55 are further indicated in FIG. 1 as A1, A2, A3, A4, A5 and A6. The wire 61 from the switch A1 is connected to one end of the coil in each of the solenoids S1 and S1a; the wire 61 of the switch A2 is connected to one end of the coil of each of the solenoids S2 and S2a and the wire 61 of the switch A3 is connected to one end of the coil of each of the solenoids S3 and S3a.

In like manner the wire 61 of the switch A4 is connected to the solenoids S4 and S4a; the wire 61 of the switch A5 is connected to the solenoids S5 and S5a and the wire 61 of the switch A6 is connected to the solenoids S6 and S6a.

The other end of the coil of each solenoid is connected by a wire 62 to the other line wire 63. Each of these solenoids is provided with an armature 64 having rollers 65 upon its end, said rollers being preferably formed of rubber or otherwise provided with a friction surface. These friction rollers 65 are each of only sufficient width to contact one thread or yarn.

Thus, as any one of the switches 55 is closed it will energize one of the solenoids associated with each of the two continually rotating rolls on that side, moving the corresponding friction rollers 65 downward against the continually rotating rolls with the corresponding thread therebetween so as to feed the thread through the eye 53 of the corresponding switch blade 54 and downward to the thread guide 66.

It will be seen that when there is tension on any one of the six threads, between the guide 66 and the corresponding switch blade 54, it will tend to close the switch operating the thread feeding means above described and when this tension is released the spring 56 will open the switch and stop the feeding of that particular thread.

From the thread guide 66 the threads are then guided through a combined guide and tension device, indicated generally at 67, and are then guided to the needles as shown in detail in FIGS. 7 through 14.

The combined guide and tension device 67 includes a guide plate 68 connected to the extension 18 of the housing 1 and provided with six vertically spaced apertures 69 flared at opposite ends as at 70 so as to permit the corresponding threads to pass freely therethrough.

The tensioning device comprises a flange 71 at the forward end of the guide plate 68 and a spring metal plate 72 attached to the opposite side of the plate 68 and having the angular terminal flange 73 with rounded edge 74 located adjacent to the rounded terminal edge 75 of the flange 71, so as to place the desired amount of tension upon threads drawn therethrough.

From the tensioning device thus described the threads pass through guide eyes 76 formed upon the ends of horizontal wires 77 carried by the depending portion 70 of the needle shifting member, one of the eyes 76 being located adjacent to each of the six needles in the station so that the thread after passing through the eye 76 is threaded through the corresponding needle.

The needles which are indicated generally at 8 may be of the novel construction shown in detail in FIGS. 15 to 24 of the drawings. Each needle comprises an elongated straight shank of circular cross section terminating at its lower end in the sharp point 78.

The longitudinal groove 79 is formed in the lower portion of the needle shank, extending radially through one side thereof, substantially to the axial center of the needle shank. The groove 79 terminates at its upper end in the arcuate upper wall 80 spaced some distance above the lower pointed end of the needle, and terminates at its lower end in the arcuate lower wall 81 located near the pointed lower end of the needle.

At a point just above the lower end of the groove 79, the side of the needle shank through which the groove is formed is cut away forming the flat surface 82. A flat plate 83 is rigidly attached to this flat surface in any suitable manner. Horizontally disposed beads or ribs 84 and 85 are formed upon the outer surface of the flat plate 83 at the upper and lower edges thereof respectively.

The thread indicated at T, for each needle, extends downward from the corresponding eye 76 into the groove 79 of the needle and passes downward through said groove behind the flat plate 83 and then upward around the outer side of said plate, over the beads or ribs 84 and 85 thereon which space the threads from the front surface of the plate, as shown in FIG. 15.

The needle does not pull thread ahead of itself on the back stroke and does not take any thread ahead of it on the down stroke, but slides down the tensioned thread until it penetrates the backing material, after which it carries enough thread with it to form a minimum height loop to enable the looper hook to enter the loop.

Referring again more particularly to FIGS. 1 and 2, the looper operating mechanism mounted in the housing 3 includes the looper slide bar 100 extending transversely through the machine and arranged for continual vertical reciprocation within the guide 101 in the housing 3.

The slide bar 100 has the reduced extension 102 at its upper end which may be formed integral therewith or which may be as shown in the drawings a separate member fixed to the slide bar 100 as by dove-tail rib and groove connection 103. This extension 102 has a groove or recess 104 therein entirely throughout the length thereof.

A looper hook 105 is located at each station of the machine within the housing 3 and has a forwardly disposed hook 106 at its upper end as in usual and well known practice. Each looper bar has a tongue or rib 107 on its rear side which may be slightly dove-tail in shape as best shown in FIG. 6.

The tongues or ribs 107 of the looper hooks of the plurality of stations of the machine are vertically slidable within similarly shaped grooves 108 in the looper positioning bar 109 which is located within the guide 110 of the housing 3 and extends transversely through the machine and is adapted to be reciprocated horizontally forward and backward as will be later described.

A latch member 111 is pivoted at 112 to the lower end of each looper hook 105 and the projection 113 at the lower end of the ratchet bar is held out of engagement with the groove 104 in the looper slide bar as by a spring 114 or equivalent means.

It is pointed out that there should be sufficient play between the tongues 107 and the grooves 108 in the looper positioning bar 109 to permit a slight rocking movement of the looper hooks 105 upon the pivots 112.

A pawl 115 is pivoted at 116 within the housing 3 and is normally held in engagement with the ratchet teeth 105a upon the corresponding looper hook 105. A projection 117 is provided upon the other end of the pawl for contact with the latch member 111 to rock the same upon its pivot 112 and engage the nose 113 thereof in the groove 104 of the looper slide bar 100. The pawl 115 is adapted to be operated by a solenoid 118, the armature 119 of which is pivotally connected as at 120 to the lower end of the pawl.

Since the preferred embodiment of the machine is adapted for selectively forming five different pile heights, five programming rolls, similar to the programming rolls indicated generally at 35, are provided for producing five different lengths of loops.

It should be understood that although in the embodiment of the invention illustrated, means is provided for selectively forming five different pile heights, this is for the purpose of illustration only and any desired number of pile heights may be formed.

Wires 121 and 122 connect opposite ends of the coil of the solenoid 118 to a circuit similar to that shown in FIG. 1 for selectively energizing the solenoid for any one of the five programming rolls as desired.

A knife 123 is provided in each station of the machine and may be selectively operated at any time as desired for cutting one or more loops as they are formed by the needles. This knife is adapted to be selectively operated by a solenoid 124, the armature 125 of which is connected to the horizontally slidable shank 126 of the knife which is slidably mounted in the guides 127 in the housing 3.

Figure 35:
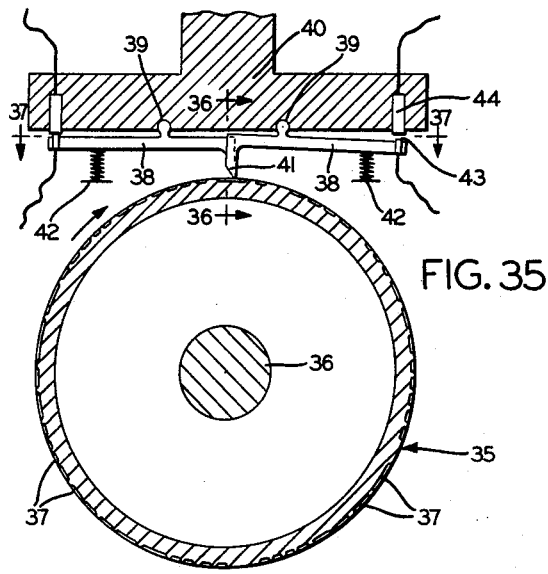
FIG. 35 is a transverse sectional view through one of the programming rolls and make-and-break means operated thereby.

The solenoid 124 is adapted to be selectively energized by means of a programming roll such as indicated generally at 35 and above described, the wires 128 connecting the solenoid to an electric circuit which is controlled by a switch such as shown in FIG. 35 operated by the programming roll.

The backing material from which the carpet or other tufted material is made upon the machine is withdrawn from a roll or the like (not shown) at the rear end of the machine and, as indicated at B, is passed around the rolls 129, then over the support plate 130, then through a set of three lateral shifting rolls 131, each of which is preferably provided with a covering of rubber or other suitable friction material as indicated at 132; then over the support plate 133 and slotted needle plate 134, at which point the backing material is tufted by the needles, the tufted material as indicated at M then passing between another set of lateral shifting rolls 131a and then around the driven rolls 135 which may be operated at any desired speed.

As is well known, the speed at which the material is passed through the machine controls the spacing between loops in each longitudinal row of tufting. It may be desirable, however, to automatically coordinate the circumferential speed of the feed rolls 129 and 135 relative to the reciprocating speed of the rolls 131 and 131a and to the stitching speed of the needles 8 by infinitely variable means such as by providing an additional programming roll and associated roll control mechanism.

Reference is now made to the drive gearing and cam arrangement for operating the machine shown in FIGS. 26 through 34 of the drawings. Such a gearing and cam assembly is provided at each side of the machine for reciprocating the bars 4, 11, 100 and 109 in desired manner. For the purpose of illustration, the cam and gear assembly at one side only of the machine is illustrated, but it should be understood that the cam and gear assembly at the other side of the machine is identical with the assembly illustrated and now described in detail.

A shaft 136 is journalled in a suitable bearing 137 at one side of the gear and cam housing 138. This shaft is adapted to be continually rotated at desired speed by a motor or other drive means (not shown).

A gear 139 is fixed upon the shaft 136 within the housing 138 and has a cam 140 fixed upon its inner side. A rod 141 is fixed to the adjacent end of the needle bar 4 and has a slide plate 142 fixed thereon for vertical movement in the guide 143.

A block 144 is fixed upon the outer surface of the slide plate 142 for vertical movement in the vertical slot 145 in the adjacent side wall of the housing 138. A roller 146 is journalled upon the block 144 and is located in the cam groove 147 in the cam 140, whereby the needle bar 4 will be intermittently reciprocated vertically in the guide 5 of the housing 1.

A shaft 148 is journalled in a bearing 149 mounted in the outer side of the housing 138, said shaft extending into the housing and having the gear 150 fixed thereon. The needle selector shuttle cam 151 is fixed upon the inner face of the gear 150 and provided with a cam groove 152, the gear 150 meshing with the gear 139.

An extension 153 upon the end of the needle selector shuttle bar 11 has an angularly disposed slide plate 154 fixed to its outer end and horizontally slidable in the guide 155 mounted upon the adjacent wall of the housing 138. A block 156 is fixed upon the outer side of the slide plate 154 and is horizontally slidable in the slot 157 in the adjacent wall of the housing 138.

A roller 158 is journalled upon the outer side of the block 156 and is located in the cam groove 152 of the cam 151. Thus as the cam 151 continually rotates the needle selector shuttle bar 11 will be intermittently reciprocated horizontally forward and backward within the guide 12 of the housing 2.

A shaft 159 is journalled in a bearing 160 on the outer side wall of the housing 138, the shaft extending within the housing and having the gear 161 fixed thereon with the looper pull-back cam 162 mounted on the inner side thereof and having the cam groove 163 therein, the gear 161 meshing with the gear 139.

An extension 164 upon the end of the looper pull-back bar 109 has a slide plate 165 fixed upon the end thereof and horizontally slidable within the guide 166. A block 167 is fixed upon the outer side of the slide plate 165 and is horizontally slidable in the slot 168 in the adjacent side wall of the housing 138.

A roller 169 is journalled upon the outer side of the block 167 and located within the cam groove 163 in the cam 162. Thus as the cam 162 continually rotates the looper pull-back bar 109 will be intermittently reciprocated forwardly and rearwardly in the guide 110 of the housing 3.

A shaft 170 is journalled in a bearing 171 upon the outer side wall of the housing 138 and extends into the housing with gear 172 fixed thereon and meshing with gear 161. A looper slide cam 173 is fixed upon the inner surface of the gear 172 and provided with the cam groove 174. A bar 175 is fixed to the end of the looper slide bar 100 and has a slide plate 176 fixed upon its end and vertically slidable in the guide 177.

In the same manner as the above described mechanism, a block fixed to the slide plate 176 slides vertically in a groove in the adjacent wall of the housing 138 and a roller 178 is journalled thereon and located in the cam groove 174 of the cam 173. Thus, as the cam 173 continually rotates the looper slide bar 100 will be intermittently reciprocated vertically in the guide 101 of the housing 3.

It will be seen that the cam groove 147 has a considerable dwell at the top of each needle stroke to provide time for the needle selector mechanism to operate, and to provide time for the looper hook to operate.

The cam groove 152 has a series of dwells equal in number to the needles in each station, giving time for the programming device to operate the solenoid 32, in order for the pawl 28 to make the proper needle selection by engagement with the proper ratchet teeth 30 on the needle shift member 15.

In like manner, the cam groove 174 has a series of dwells equal in number to the number of selections of pile heights to permit engagement of the pawl 115 with the proper ratchet teeth in the looper hook 105. The cam groove 163 is shaped to provide the proper stroke and the proper dwell of the looper hook positioning bar 109.

Figure 29:
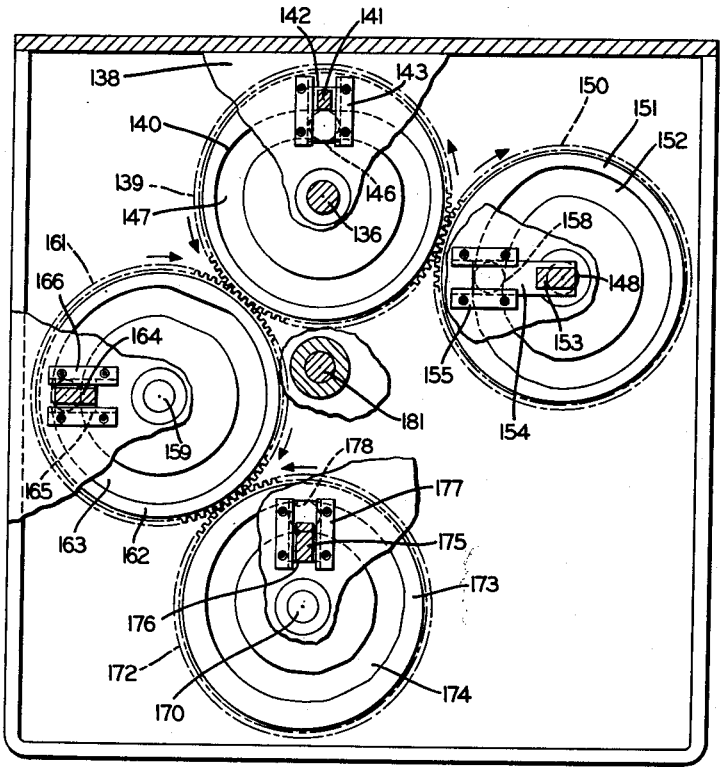
FIG. 29 is a section taken on the line 29—29, FIG. 26, showing the various gears and cams.
Figure 34:
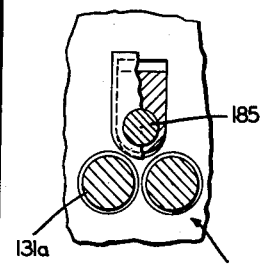
FIG. 34 is a section taken on the line 34—34, FIG. 31.
Figure 30:
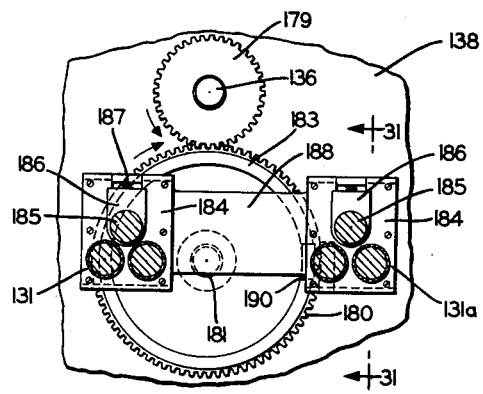
FIG. 30 is a section taken on the line 30—30, FIG. 26, showing the lateral shift mechanism for the backing material.
Figure 31:
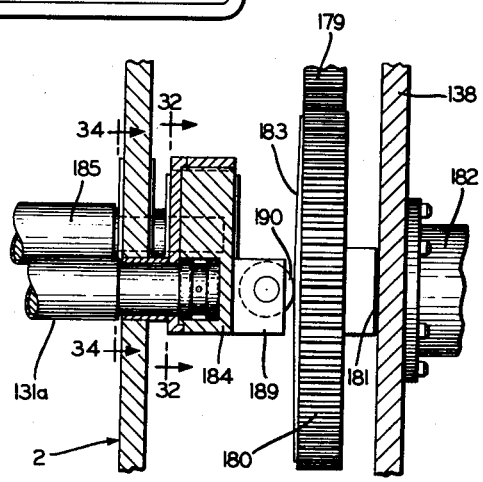
FIG. 31 is a section taken on the line 31—31, FIG. 30.
Figures 32, 33:
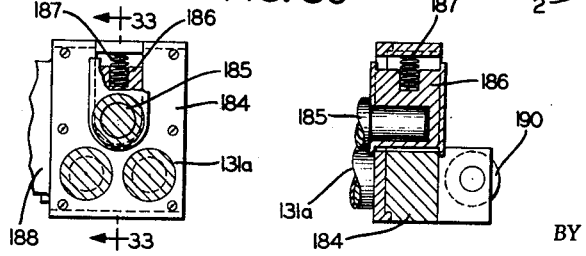
FIG. 32 is a section taken on the line 32—32, FIG. 31.
FIG. 33 is a section taken on the line 33—33, FIG. 32.

It should be noted that all of these cams are coordinated through the gearing shown in FIG. 29, so as to provide the proper timing and coordination of all of the parts.

In the event that it is desired to shift the backing material laterally in order to vary the gauge, cam means may be provided for moving the lateral shift rollers 131 and 131a laterally of the machine. For this purpose, a pinion 179 is shown journalled upon the shaft 136 and meshing with a gear 180 journalled upon a stub shaft 181 journalled upon the adjacent wall of the housing 138 as in the bearing 182. A cam surface 183 is formed on the gear 180.

Moreover, the lateral shifting of the rolls 131 and 131a may be changed during the operation of the machine relative to the stitching speed of the needles 8 by providing infinitely variable means such as providing an additional programming roll and associated roll control mechanism.

By changing the ratio of the gearing which drives this cam, further variations in the gauge may be obtained.

The lateral shift rolls 131 and 131a are each journalled in bearing blocks 184. Preferably the upper roll 185 of each group is mounted in a vertically movable bearing 186 spring loaded as indicated at 187 in FIGS. 32 and 33 in order to cause each group of rolls to frictionally engage the fabric.

The bearing blocks 184 are rigidly connected together by a bar 188 and a bracket 189 is fixed to this assembly and has a roller 190 journalled thereon for engagement with the cam surface 183. Thus, as the cam 183 rotates the lateral shift rollers 131 and 131a will be intermittently shifted laterally of the machine so as to produce two or more spaced rows of tufting with each needle producing an effect such as indicated at 191 in FIG. 26.

By slowing down the longitudinal movement of the backing material through the machine, tufting as indicated at 192 in FIG. 26 may be produced. By removing the cam 183 or cam follower 190, the rolls 131 and 131a will not be laterally shifted and the spacing of the tufts will be such as shown at 193 in FIG. 26.

If it is desired to more accurately time the machine, the timing device such as shown in FIGS. 26, 27 and 28 may supplement the programming rolls or other programming devices which control the energizing of the magnet 32 which operates the needle selector mechanism.

This timing mechanism comprises a conductor disc 194 fixed upon an insulation block 195 which may be mounted upon the end of the bearing housing 137. A wire 196 connects the conductor disc 194 to the circuit shown in FIG. 1, in which the needle selector solenoid 32 is located. An insulation disc 197 is fixed upon the drive shaft 136 as by a hub 198.

A plurality of arcuate, concentric conductor strips 199, corresponding in number to the number of needles in each station of the machine, are fixed upon the outer surface of the insulation disc 197. As there are six needles in each station of the machine there are six of these conductor strips 199.

As best shown in FIG. 27, the conductor strips 199 are of progressively decreasing length from the periphery toward the center of the insulation disc 197, and opposite ends of each conductor strip are downwardly beveled as indicated at 200. Conductor members 201 are connected to the several conductor strips 199 and contact the stationary conductor disc 194.

An insulation frame 202 is mounted adjacent to the insulation disc 197 and carries a plurality of brushes 203, corresponding in number to the conductor strips 199, one brush being arranged to contact each conductor strip 199 during a portion of each complete rotation of the disk 197.

One of the brushes 203 is shown in detail in FIG. 28, in which it will be seen that each brush comprises a cylindrical housing 204 fixed in the insulation frame 202 as by a set screw 205. The brush is in the form of a conductor plunger 206 slidable within the housing 204 and normally urged into contact with the rotating disc 197 as by a spring 207.

A wire 208 connects each brush to the circuit shown in FIG. 1, in which the needle selector solenoid 32 and the make-and-break devices 43—44 for the six different programming rolls, which control the needle selector mechanism, are located.

If desired, a similar timing mechanism may be provided in the circuit for the looper operating solenoid 118 and the five programming rolls for selectively energizing said solenoid for selectively forming any one of five different pile heights.

Figure 40:
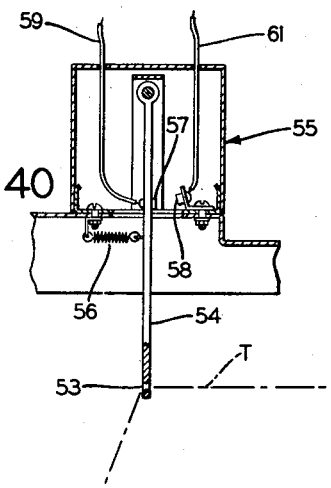
FIG. 40 is an enlarged sectional view of one of the switches which controls the solenoids which operate the thread or yarn-feed mechanism.
Figure 37:
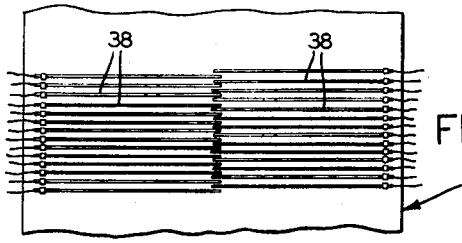
FIG. 37 is a fragmentary sectional view taken on the line 37—37, FIG. 35.
Figure 39:
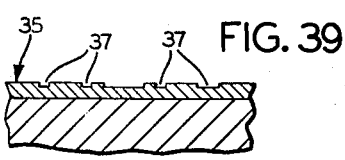
FIG. 39 is an enlarged fragmentary sectional view taken on the line 39—39, FIG. 38.
Figure 38:
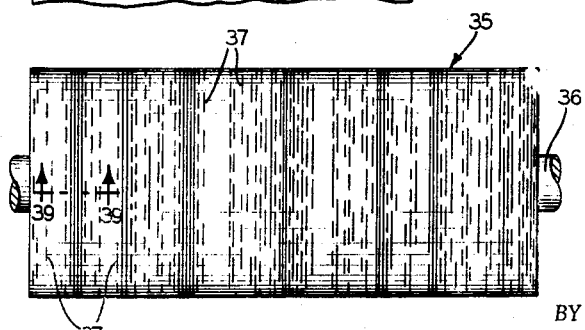
FIG. 38 is an elevation of one of the programming rolls.

In the operation of the machine, as tension is placed upon any one of the threads T1 to T6, shown in FIG. 1, by operation of the needle through which said thread is located, the corresponding switch blade 54 will be pulled into position to close the circuit between the contacts 57 and 58 shown in FIG. 40, thus closing the circuit to the solenoids which operate the corresponding friction rollers 65, moving said friction rollers into contact with the continually rotating rolls 50 and 51 or 50a and 51a, pressing the corresponding thread therebetween and causing the thread to be fed to the machine.

One needle in each station will be operated, forming loops in the corresponding color of thread in the backing material as the same is fed through the machine. By means of the programming rolls which control the energizing of the needle selector solenoid 32, the needle selector mechanism above described will be automatically operated to select any desired needle in each station of the machine at any desired time in order to produce the required pattern.

As the needle forms each loop in the fabric as shown in FIGS. 19 to 24, the corresponding looper hook is operated to engage in the loop thus formed, as indicated at L in FIGS. 21, 22 and 23, and either hold the loop at this height while the needle moves back upward as shown in the drawings, or if a longer loop is required in the pattern, the looper hook will move downward as shown in FIG. 24, pulling the loop to greater height as indicated at L' in FIG. 24.

As the looper hook moves downward to increase the height of the loop it does not rob the previously formed loop but pulls the thread down through the needle to provide a loop of desired height.

The looper hook of course is operated by the energizing of the solenoid 118 which is adapted to be selectively energized by any one of the five programming rolls provided therefor to produce the desired length of loop. As shown in FIG. 25, the machine is desired to selectively produce any of five heights of loops as indicated at L, L1, L2, L3 and L4.

The knife solenoid 124 may be selectively operated at any desired time to cut one or more loops by operation of the single programming roll provided therefor.

From the above it will be obvious that any one of a plurality of colors of yarn may be selectively fed to any one of a plurality of needles in each station of the machine by novel yarn-feeding means.

It will also be seen that novel needle selector and positioning means is provided for selectively operating any one of the plurality of needles in each station of the machine to produce any desired pattern in color.

It will also be obvious that novel looper operating mechanism is provided for selectively forming each loop to any one of a plurality of different heights.

It will also be seen that the length of the loop may be increased to any desired height without robbing the previously formed loop as in ordinary practice, the thread being pulled down through the needle by means of the looper hooks in order to increase the height of the loop.

Although programming rolls are illustrated for energizing the various solenoids that operate the needle selector mechanism, the loop height selector mechanism and the loop-cutting knife, it should be understood that this is for the purpose of illustration only, and that any suitable well-known programming device may be used for energizing these solenoids.

Figure 41:
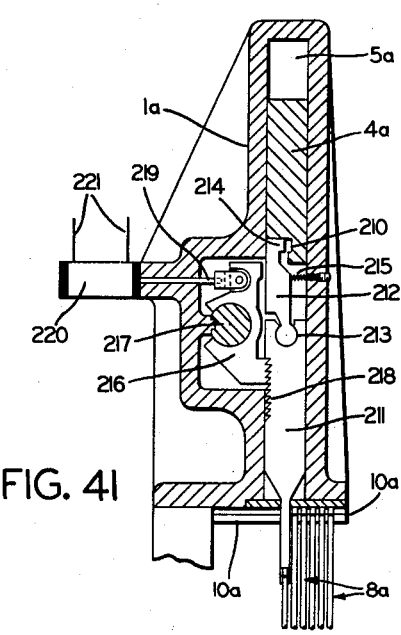
FIG. 41 is a fragmentary vertical sectional view of a modified form of needle drive.
Figure 36:
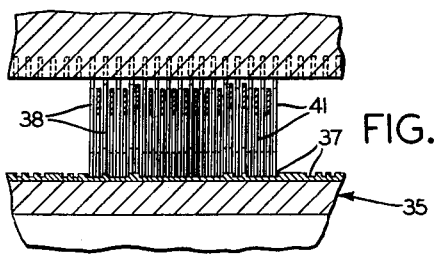
FIG. 36 is a fragmentary section taken on the line 36—36, FIG. 35.

In FIG. 41 is shown an alternate form of needle drive in which the length of stroke of the needle is selectively controlled to form loops of a plurality of different heights rather than having a single stroke of needle as in the embodiment above described.

For this purpose, a housing 1a is provided having a guide 5a therein, in which the needle slide bar 4a is reciprocally mounted. This needle slide bar may be reciprocated by a cam coordinated with the cam 173 which reciprocates the looper slide bar 100.

The construction of the needle operating mechanism is similar to the needle selector shuttle mechanism and the looper mechanism shown in FIGS. 1 and 2 and described above in detail. The needle slide bar 4a extends transversely through the machine and is provided with a longitudinal groove 210 at its lower end. The needles 8a are adapted to be suspended in the needle holder 10a in the same manner as above described.

An individual needle bar 211 is provided for each station of the machine, and the needles are adapted to be selectively connected thereto in the manner above described with reference to FIGS. 1 and 2. A latch member 212 is pivoted at 213 in each individual needle bar 211 and is provided with a nose 214 normally held out of contact with the groove 210 in the needle slide bar as by the spring or similar member 215.

A pawl 216 is pivoted at 217 within the housing and adapted to selectively engage the teeth 218 upon the individual needle bar 211. This pawl is adapted to be actuated by the armature 219 of a solenoid 220 in the manner in which the pawls in the needle selector shuttle mechanism and the looper operating mechanism above described are operated.

Wires 221 connect the solenoid 220 to a circuit leading to a plurality of programming rolls or equivalent programming devices equal in number to the number of different lengths of strokes desired.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A machine for tufting a backing fabric, including means for passing a backing fabric through the machine, there being a plurality of stations disposed transversely of the machine; a needle bar disposed transversely of the machine, means for reciprocating said needle bar toward and from the backing fabric, there being a T-shaped groove disposed longitudinally of the machine in the needle bar at each station, a needle holder in each station with a T-shaped groove therein aligned with the corresponding T-shaped groove in the needle bar, in a plurality of tufting needles in each station, said needles having T-shaped heads for engagement in the T-shaped grooves in the needle holders and needle bar, means for feeding yarn independently to each needle, and needle selector means for selectively connecting any needle in each station to the needle bar.

2. A machine for tufting a backing fabric, including means for passing a backing fabric through the machine, there being a plurality of stations disposed transversely of the machine, a needle bar disposed transversely of the machine, means for reciprocating said needle bar toward and from the backing fabric, there being a T-shaped groove disposed longitudinally of the machine in the needle bar at each station, a needle holder in each station with a T-shaped groove therein aligned with the corresponding T-shaped groove in the needle bar, a plurality of tufting needles in each station, said needles having T-shaped heads for engagement in the T-shaped grooves in the needle holders and needle bar, means for feeding yarn independently to each needle, and needle selector means for slidably moving the T-shaped needle heads into and out of the T-shaped grooves in the needle bar and needle holders for selectively connecting any needle in each station to the needle bar.

3. A machine for tufting a backing fabric, including means for passing a backing fabric longitudinally through the machine, there being a plurality of stations disposed transversely of the machine, a needle bar disposed transversely of the machine, means for reciprocating said needle bar toward and from the backing fabric, there being a plurality of tufting needles in each station, the plurality of needles in each station being disposed longitudinally of the machine, means for feeding yarn independently to each needle, and needle selector means comprising a needle selector bar disposed transversely of the machine, means for reciprocating the needle selector bar longitudinally of the machine, a needle shifting member in each station of the machine, the needles in each station being vertically slidably located through the corresponding needle shifting member, a plurality of demarcations upon each needle shifting member, a pawl in each station for selective engagement with said demarcations, and a latch member for independently connecting each needle shifting member to the needle selector bar when said pawl is disengaged from said demarcations for selectively connecting any desired needle in each station to the needle bar.

4. A machine for tufting a backing fabric, including means for passing a backing fabric longitudinally through the machine, there being a plurality of stations disposed transversely of the machine, a needle bar disposed transversely of the machine, means for reciprocating said needle bar toward and from the backing fabric, there being a plurality of tufting needles in each station, the plurality of needles in each station being disposed longitudinally of the machine, means for feeding yarn independently to each needle, and needle selector means comprising a needle selector bar disposed transversely of the machine, means for reciprocating the needle selector bar longitudinally of the machine, a needle shifting member in each station of the machine, the needles in each station being vertically slidably located through the corresponding needle shifting member, a plurality of demarcations upon each needle shifting member, a pawl in each station for selective engagement with said demarcations, a solenoid for actuating each pawl, a plurality of programming devices equal in number to the number of needles in each station for selectively energizing said solenoids, and a latch member for independently connecting each needle shifting member to the needle selector bar when said pawl is disengaged from said demarcations for selectively connecting any desired needle in each station to the needle bar.

5. A machine for tufting a backing fabric, including means for passing a backing fabric through the machine, there being a plurality of stations disposed transversely of the machine, a needle bar disposed transversely of the machine and coextensive with all of said stations, means for reciprocating said needle bar toward and from the backing fabric, there being a groove disposed longitudinally of the machine in the needle bar at each station, a needle holder in each station with a groove therein aligned with the corresponding groove in the needle bar, a plurality of tufting needles in each station, heads upon said needles for engagement in the grooves in the needle holders and needle bar, means for feeding yarn independently to each needle, and needle selector means for independently selectively connecting any needle in each station to the needle bar.

6. A machine for tufting a backing fabric, including means for passing a backing fabric longitudinally through the machine, a needle bar disposed transversely of the machine, means for reciprocating said needle bar toward and from the backing fabric, there being a plurality of stations disposed transversely of the machine, said needle bar extending transversely across all of said stations, a plurality of tufting needles in each station, the plurality of needles in each station being disposed longitudinally of the machine, means for feeding yarn independently to each needle, and needle selector means for independently selectively connecting any needle in each station to the needle bar, said needle selector means comprising a needle selector bar disposed transversely of the machine, means for reciprocating the needle selector bar longitudinally of the machine, a needle shifting member in each station of the machine, the tufting needles in each station being vertically slidably located through the corresponding needle shifting member, and means for independently selectively connecting each needle shifting member to the needle selector bar to independently selectively connect any desired needle in each station to the needle bar.

References Cited in the file of this patent

UNITED STATES PATENTS

| | | | |
|---|---|---|---|
| 876,562 | Kleutgen | Jan. 14, | 1908 |
| 1,984,330 | Boyce | Dec. 11, | 1934 |
| 1,984,331 | Boyce | Dec. 11, | 1934 |
| 2,041,674 | De Spain | May 19, | 1936 |
| 2,247,244 | Lawson | June 24, | 1941 |
| 2,308,438 | Bills et al. | Jan. 12, | 1943 |
| 2,365,013 | Sharkey et al. | Dec. 12, | 1944 |
| 2,436,545 | Behrens | Feb. 24, | 1948 |
| 2,533,420 | Blumfield | Dec. 12, | 1950 |
| 2,768,593 | Lombard | Oct. 30, | 1956 |
| 2,785,644 | Freedle et al. | Mar. 19, | 1957 |
| 2,810,471 | Shattuck | Oct. 22, | 1957 |
| 2,818,037 | McNutt | Dec. 31, | 1957 |
| 2,827,866 | Penman | Mar. 25, | 1958 |
| 2,832,301 | Wear | Apr. 29, | 1958 |
| 2,840,019 | Beasley | June 24, | 1958 |
| 2,853,032 | Odenweller | Sept. 23, | 1958 |
| 2,860,588 | Penman | Nov. 18, | 1958 |
| 2,862,465 | Card | Dec. 2, | 1958 |
| 2,868,152 | Benink et al. | Jan. 13, | 1959 |
| 2,880,684 | Masland | Apr. 7, | 1959 |
| 2,882,845 | Hoeselbarth | Apr. 21, | 1959 |
| 2,884,881 | Oberholtzer | May 5, | 1959 |
| 2,898,876 | Penman | Aug. 11, | 1959 |
| 2,935,037 | Card | May 3, | 1960 |
| 2,961,982 | Wear | Nov. 29, | 1960 |

FOREIGN PATENTS

| | | | |
|---|---|---|---|
| 25,147 | Great Britain | Nov. 15, | 1902 |

UNITED STATES PATENT OFFICE
CERTIFICATE OF CORRECTION

Patent No. 3,075,481                                January 29, 1963

Shubael C. Stratton

It is hereby certified that error appears in the above numbered patent requiring correction and that the said Letters Patent should read as corrected below.

Column 14, line 15, strike out "in", first occurrence.

Signed and sealed this 20th day of August 1963.

SEAL)
Attest:

ERNEST W. SWIDER
Attesting Officer

DAVID L. LADD
Commissioner of Patents